United States Patent [19]

Momose et al.

[11] Patent Number: 5,083,873
[45] Date of Patent: Jan. 28, 1992

[54] CERAMIC BEARING

[75] Inventors: Terunobu Momose; Tetsuo Shibata, both of Mizunami, Japan

[73] Assignee: Wing Highcera Co., Ltd., Japan

[21] Appl. No.: 589,180

[22] Filed: Sep. 27, 1990

[30] Foreign Application Priority Data

Oct. 2, 1989 [JP] Japan .................................. 1-255191
Oct. 9, 1989 [JP] Japan .................................. 1-262084

[51] Int. Cl.⁵ .............................................. F16C 17/10
[52] U.S. Cl. ................................. 384/280; 384/905.1; 384/907.1
[58] Field of Search ............... 384/275, 280, 281, 296, 384/297, 907.1, 913, 905.1

[56] References Cited

U.S. PATENT DOCUMENTS 1,817,891 8/1931 Claus ................................ 384/905.1
3,802,756 4/1974 Turner ................................ 384/206

FOREIGN PATENT DOCUMENTS 308217 12/1988 Japan .................................. 384/907.1

Primary Examiner—Lenard A. Footland
Attorney, Agent, or Firm—Eckert Seamans Cherin & Mellott

[57] ABSTRACT

A ceramic bearing is provided by a ceramic inner ring and a ceramic outer ring. The ceramic inner ring includes an axial hole for receiving a shaft at the center of the inner ring. The inner ring further includes an outer cylindrical surface coaxial with the axial hole, and a plane surface extending from the cylindrical surface. The plane surface is perpendicular to the axial hole. The ceramic outer ring includes an inner cylindrical surface which slidably contacts the outer cylindrical surface of the ceramic inner ring, and a plane surface which slidably contacts the plane surface of the ceramic inner ring. The shaft is fixed within the axial hole of the inner ring, and sliding does not occur between the shaft and the inner ring. Accordingly, there is no chance of abrasion on the shaft even after a long period of use.

1 Claim, 3 Drawing Sheets

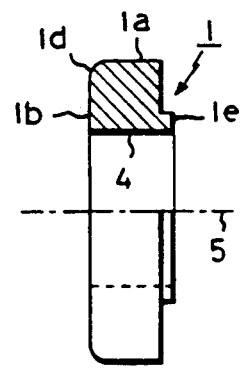
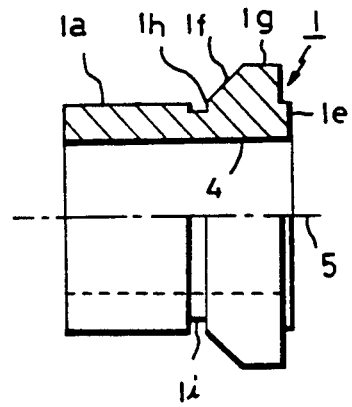
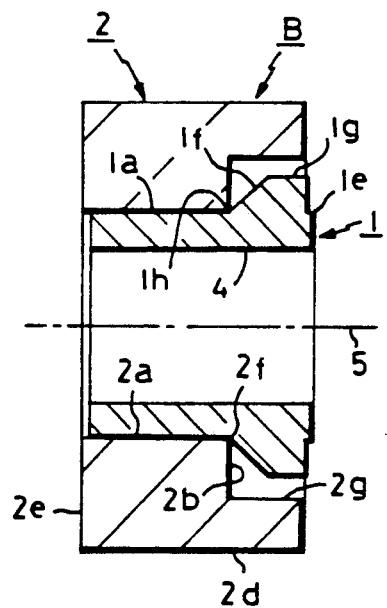
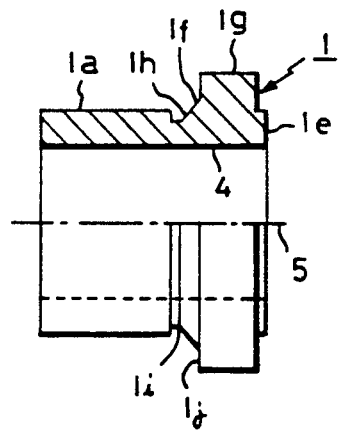

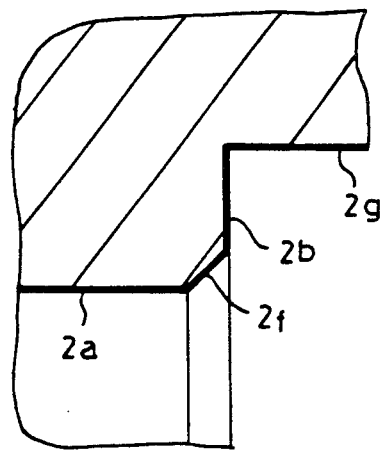
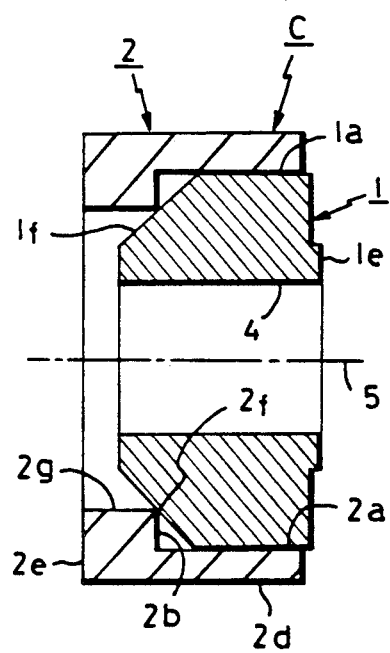

CERAMIC BEARING

BACKGROUND OF THE INVENTION

1. Field of the Invention

The invention relates to a ceramic bearing which is able to support a shaft to which a thrust load and a radial load are applied simultaneously or separately.

2. Prior Art

It is known to use a sliding bearing or a rolling bearing to support a rotary shaft in a machine frame or other device.

There are different kinds of rolling bearings such as ball bearings, roller bearings, and needle bearings which have rolling members such as balls, rollers, and needles, respectively, between an inner ring and an outer ring. Other kinds of radial and thrust bearings are used to support a load applied to a shaft which is engaged with the inner ring. Deep-groove type bearings, angular ball type bearings, and tapered-roller type bearings are known for supporting a shaft to which a radial load and a thrust load are applied simultaneously. The rolling bearings are standardized and are selected by choosing the most appropriate one when a machine is designed.

Some of the sliding bearings are constructed with a metal support made of steel, cast iron, copper, or the like. A white metal layer is laminated thereon, or an oil impregnated alloy is laminated upon or embedded in the support. Others of the sliding bearings are made from gun metal, synthetic resin, or the like which is formed to a sleeve shape. Generally, in conventional sliding bearings, bearings which support the radial load and bearings which support the thrust load are separately standardized.

The rolling bearings and the sliding bearings have distinct characteristics. Accordingly, when choosing a suitable bearing, these characteristics must be considered. However, the rolling bearings and sliding bearings may still prove troublesome.

For instance, in the rolling bearings the phenomenon of rolling fatigue limits their service life. The rolling bearings have low resistance to heat stress. Further, the rolling bearings have a relatively large number of components, which makes them costly.

For the sliding bearings, friction losses are greater due to sliding contact between the outer periphery of the shaft with the inner periphery of the bearing. This problem necessitates the application of forced lubrication or self lubrication to the contact surfaces of the shaft and the bearing. In addition, when a shaft supports a radial load and a thrust load simultaneously, an off the shelf radial bearing and thrust bearing must be used, or a new bearing must be designed.

On the other hand, ceramic bearings having high compression strength and friction resistance and small friction coefficients have recently been developed. Applicant has developed several kinds of ceramic bearings and has already filed patent applications (e.g., Japanese Patent application No. 63-325933).

Further, U.S. Pat. No. 4,634,300 discloses a rolling bearing constructed with a ceramic roller as a rolling body. The reference teaches a construction for a rolling bearing having resistance to high temperature and corrosion, but the bearing still has a large number of components.

SUMMARY OF THE INVENTION

It is an object of the invention to provide a sliding bearing which is able to support a shaft to which a radial load and a thrust load are applied simultaneously or separately.

It is another object of the invention to provide a bearing having a small number of parts by constructing inner and outer rings of the bearing from ceramic material.

These and other objects are accomplished by a bearing comprising a ceramic inner ring and a ceramic outer ring. The ceramic inner ring defines an axial hole for fixedly receiving a shaft. An outer periphery of the inner ring defines a cylindrical surface which is coaxial with the axial hole, and an end portion of the inner ring defines a plane surface which is substantially perpendicular to the axial hole. An inner periphery of the ceramic outer ring defines a cylindrical surface which slidably contacts the outer periphery of the ceramic inner ring, and a plane surface which slidably contacts the plane surface of the ceramic inner ring.

In another embodiment, the ceramic inner ring defines an axial hole for fixedly receiving a shaft. The inner ring has an outer periphery which defines a cylindrical surface coaxial with the axial hole, and a taper surface extending from and tapering towards the cylindrical surface. The outer ring has an inner periphery which defines a cylindrical surface which slidably contacts the cylindrical surface defined by the outer periphery of the ceramic inner ring, and a sliding surface which slidably contacts a part of the taper surface of the ceramic inner ring.

For the invention comprising the ceramic inner ring and the ceramic outer ring, wherein the ceramic inner ring (hereinafter referred to as "inner ring") defines an axial hole for receiving a shaft, a cylindrical surface coaxial with the axial hole is defined on an outer periphery of the inner ring, and a plane surface substantially perpendicular to the axial hole is defined by an end portion of the inner ring, and the ceramic outer ring (hereinafter referred to as "outer ring") defines a cylindrical surface which slidably contacts the cylindrical surface defined by the outer periphery of the inner ring, and a plane surface which slidably contacts the end portion of the inner ring, when a shaft is fixedly received in the axial hole and a radial load and a thrust load are applied to the shaft, the radial load is supported by the cylindrical surfaces defined by the inner ring and the outer ring, and the thrust load is supported by the plane surfaces of the inner ring and the outer ring.

For the bearing comprising the inner and outer rings wherein the outer periphery of the inner ring defines a cylindrical surface and a tapered surface, and the inner periphery of the outer ring defines a cylindrical surface and a sliding surface, when a shaft is fixedly received in the axial hole, a radial load applied to the shaft is supported by the cylindrical surfaces defined by the inner and outer rings, and a thrust load applied to the shaft is supported by contact of the sliding surface of the outer ring with a part of the tapered surface of the inner ring.

Further, the bearing comprising the inner and outer rings has fewer parts than the conventional rolling bearing, thereby lowering the cost of the bearing.

Furthermore, since the shaft is fixedly received in the axial hole defined by the inner ring, sliding does not occur between the shaft and the inner ring. Thus, no abrasion can occur on the shaft even after long periods of use.

Since the inner and outer rings are constructed of ceramic material, sliding friction is reduced thereby decreasing heat generated due to friction. Further, material expansion due to the heat is reduced, thereby reducing stresses between a machine frame and shaft.

BRIEF DESCRIPTION OF THE DRAWINGS

FIG. 3 is a partial cross-section view of an inner ring of the first embodiment of the bearing according to the invention.

FIG. 4 is a cross-section view of a second embodiment of the bearing according to the invention.

FIG. 5 is a partial cross-section view of an inner ring of the second embodiment of the bearing according to the invention.

FIG. 6 is a partial cross-section view of another embodiment of the inner ring of the second embodiment of the bearing according to the invention.

FIG. 7 is a cross-section view of a portion of an outer ring of the second embodiment of the bearing according to the invention.

FIG. 8 is a cross-section view of a third embodiment of the bearing according to the invention.

DETAILED DESCRIPTION OF THE PREFERRED EMBODIMENTS

Figure 1:
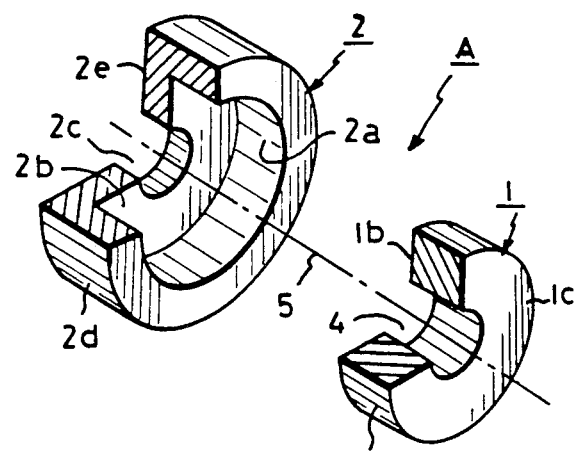
FIG. 1 is an exploded view of a first embodiment of a bearing according to the invention.
Figure 2:
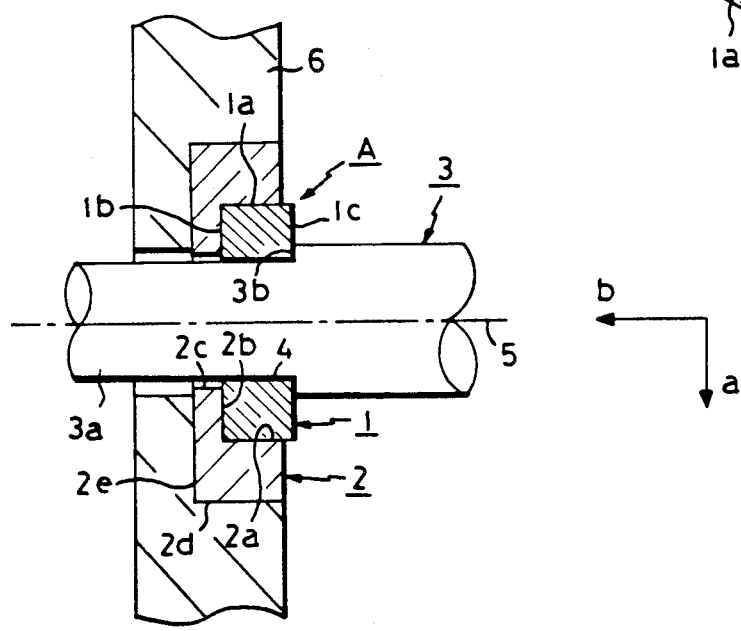
FIG. 2 is a cross-section view of the first embodiment of the bearing according to the invention.

As shown in FIGS. 1 and 2, a bearing designated generally as A comprises an inner ring 1 and an outer ring 2.

The inner ring 1 is made from an oxide ceramic material such as partially stabilized zirconia (PSZ) or alumina which is charged into a mold, press-formed, and sintered at 1500° C. to 1600° C. An axial hole 4 for fixedly receiving a shaft 3 is defined at the center of the inner ring 1. The axial hole 4 is dimensioned to be slightly smaller than the diameter of the shaft 3 in order to receive the shaft 3 in a press-fit. An axis 5 of the axial hole corresponds to a centerline of the bearing A.

An outer periphery of the inner ring 1 defines a cylindrical surface 1a which is coaxial with the axis 5. The cylindrical surface 1a slidably contacts a cylindrical surface 2a defined by an inner periphery of the outer ring 2. A radial load applied to the shaft 3 is transmitted to the outer ring 2 through the cylindrical surfaces 1a, 2a. For this purpose, it is necessary that the cylindrical surface 1a is coaxial with the axis 5. Further, the diameter of the cylindrical surface 1a is dimensioned to provide sufficient strength for supporting the radial load on the bearing, and a radial length of the inner ring 1 is dimensioned to provide sufficient strength for supporting a thrust load on the bearing.

The outer periphery of the inner ring 1 includes an end surface of a front side (left side of FIG. 2) of the inner ring which defines a plane surface 1b substantially perpendicular to the axis 5. The plane surface 1b slidably contacts a plane surface 2b defined by the outer ring 2 to transmit a thrust load applied to the shaft 3 to the outer ring 2. An end surface of a rear side (right side of FIG. 2) of the inner ring 1 defines a plane surface 1c which is substantially perpendicular to the axis 5, and against which abuts a step portion 3b of a journal portion 3a defined by the shaft 3.

The outer ring 2 is made from an oxide ceramic material such PSZ or alumina which is charged into a mold the same as the inner ring, press-formed and sintered at 1500° C. to 1600° C.

An inner periphery of the outer ring 2 defines a cylindrical surface 2a having a clearance relative to the cylindrical surface 1a defined by the outer periphery of the inner ring 1. The cylindrical surface 2a slidably contacts the cylindrical surface 1a of the inner ring 1 and a radial load applied to the shaft 3 is transmitted through the inner ring 1 to the cylindrical surface 2a. For this purpose, the cylindrical surface 2a is coaxial with the axis 5.

The inner periphery of the outer ring 2 further defines a plane surface 2b which is substantially perpendicular to the cylindrical surface 2a connecting therewith, and at a right angle to the axis 5. The plane surface 2b slidably contacts the plane surface 1b defined by the inner ring 1, and a thrust load applied to the shaft 3 is transmitted through the inner ring 1 to the plane surface 2b.

A hole 2c is defined at the center of the outer ring 2. The hole 2c extends from plane surface 2b to plane surface 2e. The hole 2c has a diameter dimensioned for loosely receiving the shaft 3 which is fixedly received in the axial hole 4 of the inner ring 1.

An outer periphery 2d of the outer ring 2 defines a cylindrical surface which is coaxial with the axis 5. The plane surface 2e of the outer ring 2 is substantially perpendicular to the axis 5. Outer periphery 2d and plane surface 2e are fixedly received in a machine frame or casing 6.

The axial hole 4, the cylindrical surface 1a, and the plane surface 1b of the inner ring 1, and the cylindrical surface 2a, the plane surface 2b, the hole 2c, the outer periphery 2d and the plane surface 2e of the outer ring 2 are formed simultaneously when the inner and outer rings are press-formed.

In the above forming, dimensional accuracy for the inner ring 1 and the outer ring 2 on the order of a design dimension±0.005 mm can be obtained for each part. Further, average surface roughness on the order of 0.8 micron can be obtained.

In order to construct the bearing A having the inner ring 1 and the outer ring 2, the cylindrical surface 1a and the plane 1b of the inner ring 1 are inserted within a hollow portion of the outer ring 2 comprising the plane 2b connecting with cylindrical surface 2a. By slidably contacting the cylindrical surfaces 1a, 2a and the plane surfaces 1b, 2b respectively, the shaft 3 fixedly received in the inner ring 1 can be supported.

It may be necessary to perform a grinding operation on the cylindrical surface 1a, the cylindrical surface 2a and the surface of the outer periphery 2d, in order to achieve a desired accuracy for the bearing A. It may be necessary to lap each contact surface including cylindrical surfaces 2a, 1a and plane surfaces 2b, 1b after engaging the inner ring 1 with outer ring 2. The lapping can be performed by applying a grinding agent such as diamond powder, etc. to each contact surface and performing a relative rotation between the inner ring 1 and the outer ring 2. The bearing A can be made to operate more smoothly by grinding or lapping the inner ring 1 and the outer ring 2.

A case where the shaft 3 is supported by the bearing A constructed as above will be described with reference to FIG. 2.

In FIG. 2, the outer ring 2 which comprises the bearing A is fixedly attached to the machine frame 6. At the axial hole 4 of the inner ring 1, a journal portion 3a of the shaft 3 is engaged thereto and the step portion 3b of the shaft 3 is abutted against abutting surface 1c of the inner ring 1.

If a radial load having a direction shown by arrow "a" and a thrust load having a direction shown by arrow "b" are applied the shaft 3 simultaneously, the radial load is transmitted to the inner ring 1 from the journal portion 3a, transmitted to the outer ring 2 by way of the cylindrical surfaces 1a and 2a, and further transmitted to the machine frame 6 where it is supported. The thrust load is transmitted from the step portion 3b of the shaft 3 to the abutting surface 1c of the inner ring 1, transmitted to the outer ring 2 through the plane surfaces 1b and 2b, and further transmitted to the machine frame 6 from the plane 2b, thereby being supported by the frame 6.

Thus, the bearing A according to this invention is able to support the shaft 3 to which the radial load and the thrust load are applied simultaneously or separately by forming the cylindrical surfaces 1a, 2a coaxial with the axis 5, and forming the plane surfaces 1b, 2b substantially perpendicular to the axis 5 so that they may slidably contact each other.

In the bearing A, it is necessary to choose a dimension for the diameter of the cylindrical surface 1a and for the radial length of the plane surface 1b according to the radial load and the thrust load to be applied to the shaft 3. Accordingly, when the radial load applied to the shaft 3 is large, the strength of the inner ring can be increased by enlarging the diameter of the cylindrical surface 1a. However, when the diameter of the cylindrical surface 1a is enlarged, the contact area between the plane surfaces 1b, 2b becomes larger. Relative sliding velocity between the contact surfaces becomes larger in proportion to a radial dimension along the surfaces. Thus, friction loss increases. In order to decrease the friction loss, it is desirable to form a beveled or radiused portion 1d, as shown in FIG. 3, having a comparatively large dimension which connects the cylindrical surface 1a and the plane surface 1b of the inner ring 1. By providing the beveled portion 1d on the inner ring 1, it is possible to reduce the contact area of the cylindrical surfaces 1a, 2a and the plane surfaces 1b, 2b without reducing the strength of the inner ring 1. In other words, it is possible to reduce the friction loss at the plane surfaces 1b and 2b by decreasing the area where the radial load and thrust load are applied. Although surface loads on the contact surfaces become high due to reducing the contact area of the cylindrical surfaces 1a, 2a and the plane surfaces 1b 2b, the contact surfaces are sufficiently pressure resistant because the inner ring 1 and the outer ring 2 are made of ceramic material.

It is also possible to mate the inner ring 1 smoothly to a concave surface connecting the cylindrical surface 2a and the plane surface 2b of the outer ring 2 by providing the beveled portion 1d on the inner ring 1.

The end surface of the rear side of the inner ring 1 may have a small step which defines an abutting surface 1e as shown in FIG. 3. The abutting surface 1e can be made perpendicular to the axis 5 with a high degree of accuracy. Further, by forming the inner ring 1 with the abutting surface 1e, even when the journal portion 3a of the shaft 3 is engaged with the axial hole 4 of the inner ring 1 and the step portion 3b is abutted against the abutting surface 1e, there is no chance of contact between the step portion 3b and the outer ring 2.

In another embodiment as shown in FIG. 4, a bearing designated generally as B comprises the inner ring 1 and the outer ring 2. In the Figures, elements having like features as those of the first embodiment have the same numbers, and a detailed explanation thereof is omitted.

As shown in FIG. 5 and FIG. 6, the cylindrical surface 1a is coaxial with the axis 5 at the front side on the outer periphery of the inner ring 1. At the rear side of the cylindrical surface 1a, a taper surface 1f is defined which extends from the cylindrical surface 1a with an enlarging diameter. The taper surface 1f slidably contacts a sliding surface 2f defined by the inner periphery of the outer ring 2, thereby transmitting the thrust load from the shaft 3 to the outer ring 2.

A cylindrical surface 1g coaxial with the shaft 5 extends from the taper surface 1f. The cylindrical surface 1g does not contact the outer ring 2. Accordingly, the cylindrical surface 1g is not essential for operation of the bearing B.

In this embodiment, the sliding surface 2f of the outer ring 2 is defined at a rear end of the cylindrical surface 2a. A base portion 1h of the taper surface 1f slidably contacts the sliding surface 2f. Since it is difficult to form the base portion 1h as a sharp corner during formation of the inner ring 1 it is desirable to form a ring-shaped groove 1i around the periphery of the inner ring 1 at a position corresponding to the base portion 1h. The ring-shaped groove 1i ensures complete contact of the base portion 1h with the sliding surface 2f around the entire periphery of the inner ring 1.

Further, the taper surface 1f defined by the inner ring 1 must have a length which is larger than a length of the sliding surface 2f. In order to accomplish this, it is desirable that the taper surface 1f extends from the cylindrical surface 1a to the cylindrical surface 1g as shown in FIG. 5. Further, as shown in FIG. 6, the bearing B may be constructed with the length of the taper surface 1f being larger than the length of the sliding surface 2f, and a plane surface 1j substantially perpendicular to the axis 5 extending from the taper surface 1f to the cylindrical surface 1g.

The inner periphery of the outer ring 2 defines a cylindrical surface 2a having a fixed clearance with respect to the cylindrical surface 1a defined by the inner ring 1, and having a length approximately equal to a length of the cylindrical surface 1a. At the rear end of the cylindrical surface 2a, the sliding surface 2f slidably contacts the taper surface 1f defined by the inner ring 1, as shown in FIG. 4. FIG. 7 shows a detailed configuration of the sliding surface 2f. The sliding surface 2f slidably contacts the base portion 1h which is a part of the taper surface 1f defined by the inner ring 1, and it receives the thrust load applied to the shaft 3 which is transmitted through the inner ring 1.

The plane surface 2b substantially perpendicular to the axis 5 extends from the rear side of the cylindrical surface 2a. The intersection of the cylindrical surface 2a and the plane 2b defines the sliding surface 2f which is preferably tapered at an angle equivalent to an angle of the taper surface 1f. The sliding surface 2f need not have a taper shape, but instead may have a curved shape.

For the sliding surface 2f having a taper shape, contact of the sliding surface 2f with the taper surface 1f is a planar contact, while for the sliding surface 2f having a curved shape, contact of the sliding surface 2f with the taper surface 1f is a linear contact.

A cylindrical surface 2g extends from the plane surface 2b. A diameter of the surface 2g is larger than a diameter of the cylindrical surface 1g defined by the inner ring 1. Accordingly, the surface 2g does not contact the inner ring 1.

In the bearing B having the inner ring 1 and the outer ring 2 described above, the cylindrical surface 1a and the taper surface 1f of the inner ring 1 are in contact with the cylindrical surface 2a and the sliding surface 2f of the outer ring 2, thereby supporting the shaft 3 fixedly received in the inner ring 1. A radial load applied to the shaft is transmitted to the inner ring from the journal portion 3a, is transmitted to the outer ring 2 through the cylindrical surfaces 1a, 2a, and is further transmitted to the machine frame from the outer ring 2 where it is supported the same as in the first embodiment. A thrust load applied to the shaft is transmitted to the inner ring 1 through the abutting surface 1e from the step portion 3b of the shaft, is transmitted to the outer ring 2 through the sliding surface 2f, and is further transmitted to the machine frame from the outer ring 2 where it is supported in like manner to the first embodiment.

In FIG. 8, a bearing C is constructed comprising the inner ring 1 and the outer ring 2. The outer periphery of the inner ring 1 defines the inner cylindrical surface 1a at a rear side of the inner ring 1, and further defines the taper surface 1f which decreases in diameter as it extends toward a front side of the inner ring 1. The inner periphery of the outer ring 2 defines the cylindrical surface 2a. The plane surface 2b is perpendicular to the axis 5 and extends radially inwardly from the cylindrical surface 2a. The cylindrical surface 2g is coaxial with the axis 5 and extends from the plane surface 2b. The sliding surface 2f is defined by the intersection of the plane surface 2b and the cylindrical surface 2g the same as in the second embodiment described above. The diameter of the plane surface 2b is larger than that of the axial hole 4 of the inner ring 1 and smaller than that of the cylindrical surface 1a.

The bearing C supports a radial load applied to the shaft which is fixedly received in the axial hole 4 by contact of the taper surface 1f and the sliding surface 2f. By appropriate calculations, a diameter of the cylindrical surface 2g can be selected which maintains pressure on the contact surfaces within acceptable limits.

In the above bearings A, B, and C, since the inner ring 1 and the outer ring 2 are made from ceramic material, friction coefficient thereof is small and friction loss in the bearing is also small. By using ceramic material to support the shaft, there is no need for lubrication between the cylindrical surfaces 1a and 2a, the taper surface 1f and the sliding surface 2f. Even when heat is generated due to friction, since a coefficient of thermal expansion for ceramics is about 8 to $11 \times 10^{-6}$/° C., excessive stress due to thermal expansion will not be produced. Further, since ceramics have an upper temperature operating limit between 600° C. to 1000° C., there is little likelihood of deterioration of the inner ring 1 and the outer ring 2 due to excessive heat generation.

We claim:

1. A ceramic bearing comprising:
    a ceramic inner ring defining an axial hole for fixedly receiving a shaft therein, the axial hole defining an axis, an outer periphery of the ceramic inner ring defining a cylindrical surface which is coaxial with the axis, the outer periphery further defining a plane surface extending from the cylindrical surface, the plane surface being perpendicular to the axis and being connected to the cylindrical surface at an edge which defines a bevel means for friction reduction; and,
    a ceramic outer ring having an inner periphery defining a cylindrical surface which slidably contacts the cylindrical surface of the ceramic inner ring, the inner periphery further defining a plane surface which is perpendicular to the cylindrical surface of the ceramic outer ring, the plane surface of the ceramic outer ring slidably contacting the plane surface of the ceramic inner ring.

* * * * *